(12) United States Patent
Kalev (10) Patent No.: US 8,030,787 B2
(45) Date of Patent: Oct. 4, 2011

(54) MBACKUP FLYWHEEL POWER SUPPLY

(75) Inventor: Claude Michael Kalev, Newbury Park, CA (US)

(73) Assignee: Beaver Aerospace and Defense, Inc., Livonia, MI (US)

( * ) Notice: Subject to any disclaimer, the term of this patent is extended or adjusted under 35 U.S.C. 154(b) by 472 days.

(21) Appl. No.: 12/340,619

(22) Filed: Dec. 19, 2008

(65) Prior Publication Data

US 2009/0134705 A1 May 28, 2009

Related U.S. Application Data

(60) Continuation-in-part of application No. 11/624,206, filed on Jan. 17, 2007, now abandoned, which is a continuation of application No. 11/251,394, filed on Oct. 14, 2005, now Pat. No. 7,187,087, which is a division of application No. 10/863,868, filed on Jun. 7, 2004, now Pat. No. 7,109,622.

(60) Provisional application No. 60/476,226, filed on Jun. 6, 2003.

(51) Int. Cl.
*H02K 7/09* (2006.01)
(52) U.S. Cl. ........................... 290/1 R; 310/90.5
(58) Field of Classification Search ........... 310/90.5
See application file for complete search history.

(56) References Cited

U.S. PATENT DOCUMENTS

| | | | |
|---|---|---|---|
| 3,860,300 A | 1/1975 | Lyman | |
| 4,012,651 A * | 3/1977 | Burson | 310/153 |
| 4,444,444 A | 4/1984 | Benedetti et al. | |
| 4,511,190 A | 4/1985 | Caye et al. | |
| 4,612,494 A * | 9/1986 | Kawamura | 322/4 |
| 4,617,726 A * | 10/1986 | Denk | 29/598 |
| 5,614,777 A | 3/1997 | Bitterly et al. | |
| 5,703,423 A | 12/1997 | Fukao et al. | |
| 5,864,303 A | 1/1999 | Rosen et al. | |
| 5,998,899 A * | 12/1999 | Rosen et al. | 310/90.5 |
| 6,043,577 A | 3/2000 | Bornemann et al. | |
| 6,166,469 A | 12/2000 | Osama et al. | |
| 6,331,214 B1 * | 12/2001 | Koga et al. | 148/101 |
| 6,624,542 B1 | 9/2003 | Gabrys et al. | |
| 6,794,777 B1 | 9/2004 | Fradella | |
| 6,897,587 B1 * | 5/2005 | McMullen et al. | 310/90.5 |
| 6,995,529 B2 | 2/2006 | Sibley | |
| 7,109,622 B2 | 9/2006 | Khalizadeh | |
| 7,187,087 B2 | 3/2007 | Khalizadeh | |
| 7,876,011 B2 * | 1/2011 | Stiesdal | 310/156.23 |
| 2004/0051416 A1 * | 3/2004 | Yamada et al. | 310/156.28 |
| 2006/0038453 A1 | 2/2006 | Khalizadeh | |
| 2007/0114795 A1 | 5/2007 | Khalizadeh | |
| 2010/0033046 A1 * | 2/2010 | Chiba et al. | 310/90.5 |

FOREIGN PATENT DOCUMENTS

| | | | |
|---|---|---|---|
| JP | 01103145 A * | 4/1989 | |
| JP | 2005240963 | 9/2005 | |

* cited by examiner

*Primary Examiner* — Joseph Waks
(74) *Attorney, Agent, or Firm* — Foley & Lardner LLP (57) ABSTRACT

A flywheel system includes a synchronous reluctance and a permanent magnet generator.

1 Claim, 10 Drawing Sheets

MBACKUP FLYWHEEL POWER SUPPLY

PRIORITY CLAIM AND INCORPORATION BY REFERENCE

Priority Claim

This application is a continuation in part of U.S. application Ser. No. 11/624,206 filed Jan. 17, 2007 now abandoned which is a continuation of U.S. application Ser. No. 11/251,394 filed Oct. 14, 2005 now U.S. Pat. No. 7,187,087, which claims priority from U.S. Divisional application Ser. No. 10/863,868 filed Jun. 7, 2004 now U.S. Pat. No. 7,109,622, which claims priority from U.S. Provisional Application 60/476,226 filed Jun. 6, 2003.

INCORPORATION BY REFERENCE

This application incorporates by reference U.S. Pat. Nos. 7,078,876 to Hofmann et al. issued Jul. 18, 2006, 7,109,622 to Kalev (formerly Khalizadeh) issued Sep. 19, 2006, 5,708,312 to Rosen et al. issued Jan. 13, 1998 and 5,998,899 to Rosen et al. issued Dec. 7, 1999.

BACKGROUND OF THE INVENTION

Field of Invention

The present invention relates to the mechanical arts and energy conversion and storage systems. In particular, the present invention relates to flywheel electric power supply systems having high-speed rotating assemblies.

Flywheel energy storage systems have provided a mechanical energy storage solution for hundreds of years as evidenced by the potter's wheel. Such systems differ in many respects from modern-day flywheel energy storage solutions. More recent design imperatives including high power density and electric power outputs have led to lightweight, high-speed flywheels operating in evacuated chambers and driving a similarly high-speed electric generator.

SUMMARY OF THE INVENTION

Now, in accordance with the invention, there has been found an assembly including a flywheel mass for exchanging mechanical power with an electric motor-generator.

BRIEF DESCRIPTION OF THE DRAWINGS

The present invention is described with reference to the accompanying drawings that illustrate the invention and, together with the description, explain the principles of the invention enabling a person skilled in the relevant art to make and use the invention.

DESCRIPTION OF THE PREFERRED EMBODIMENTS

General Description

Figure 1A:
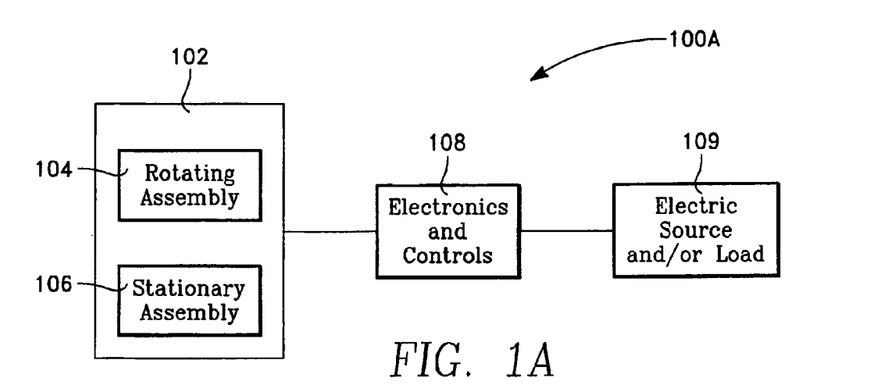
FIG. 1A is a block diagram of a flywheel power supply in accordance with the present invention.

FIG. 1A shows a flywheel power supply in accordance with the present invention 100A. An evacuated containment 102 encloses a rotating assembly 104 and an associated stationary assembly 106. An electronics and controls package 108 exchanges electric power with each of the stationary assembly 106 and an electrical source and/or load 109.

Figure 1B:
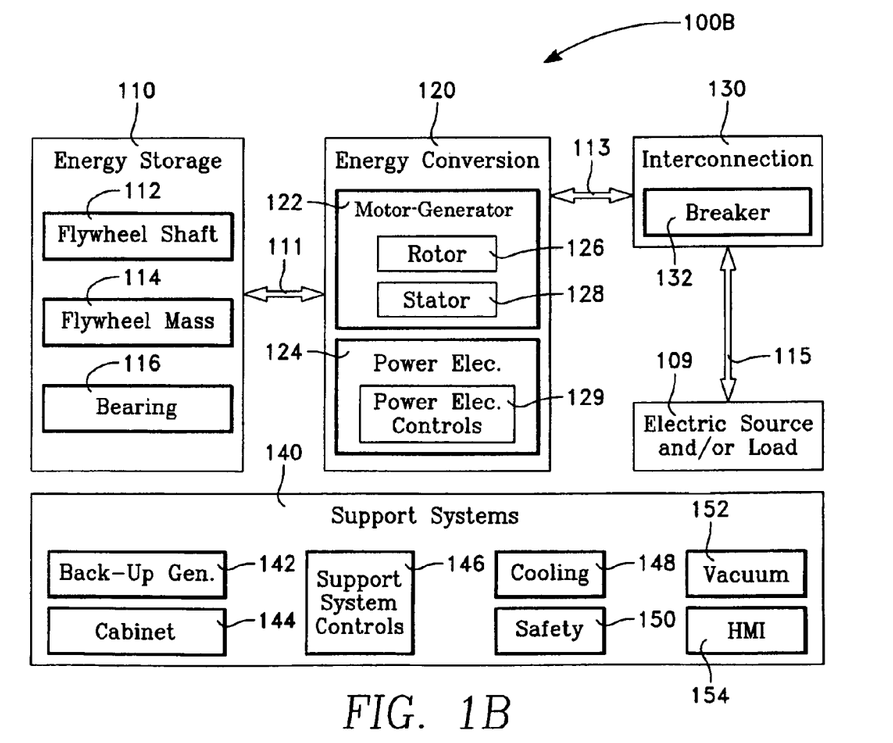
FIG. 1B is a block diagram showing systems of various embodiments of the flywheel power supply of FIG. 1A.

FIG. 1B shows systems of a flywheel power supply 100 B. An energy conversion system 120 exchanges energy 111 with an energy storage system 110 and exchanges energy 113, 115 with an electric source and/or load 109 via an optional interconnection system 130. In various embodiments, one or more support systems 140 provide services to one or more of the energy storage, energy conversion and interconnection systems.

Included in the energy storage system 110 is a flywheel mass 114, a shaft and/or bearing interface 112, and at least one bearing supporting the mass 116. Energy in the form of kinetic energy is stored in rotating flywheel parts including the flywheel mass.

Energy conversion takes place in the energy conversion system 120 when an electric motor-generator 122 exchanges mechanical power bi-directionally with the shaft to produce or consume electric power that is processed by a power electronics package 124 controlled by power electronics controls 129. An electric source and/or load 109 exchanges power 113, 115 with a power electronics package 124 and in some embodiments the electric power flows through a breaker 132 of the optional interconnection system 130 (as shown).

Within the energy storage system are the flywheel shaft 112 and flywheel mass 114 and within the energy conversion system is a rotor of the motor generator 122; these parts are included in a rotating assembly 104. In various embodiments, the flywheel mass exchanges mechanical energy with the motor-generator.

In some embodiments the flywheel mass 114 and motor-generator rotor 126 are indirectly coupled. And, in some embodiments the flywheel mass and motor-generator are directly coupled. In an embodiment, the flywheel mass is coupled to, and constrained to rotate in synchrony with, the rotor. Related to the rotating assembly is a stationary assembly 106 that includes the motor-generator stator of the energy conversion system 128.

In various embodiments, the flywheel power supply includes one or more support systems 140. Among these support systems are a back-up generator for providing back-up electric power 142, a cabinet for housing parts of the flywheel power supply 144, support systems controls 146 for controlling among other things electromagnetic bearings, a cooling system 148 for collecting and rejecting heat produced by the flywheel power supply, one or more safety systems 150 including a flywheel mass safety containment system, a vacuum system 152 for evacuating a containment, and a human machine interface 154.

Flywheel and Motor-Generator Description

Figure 2:
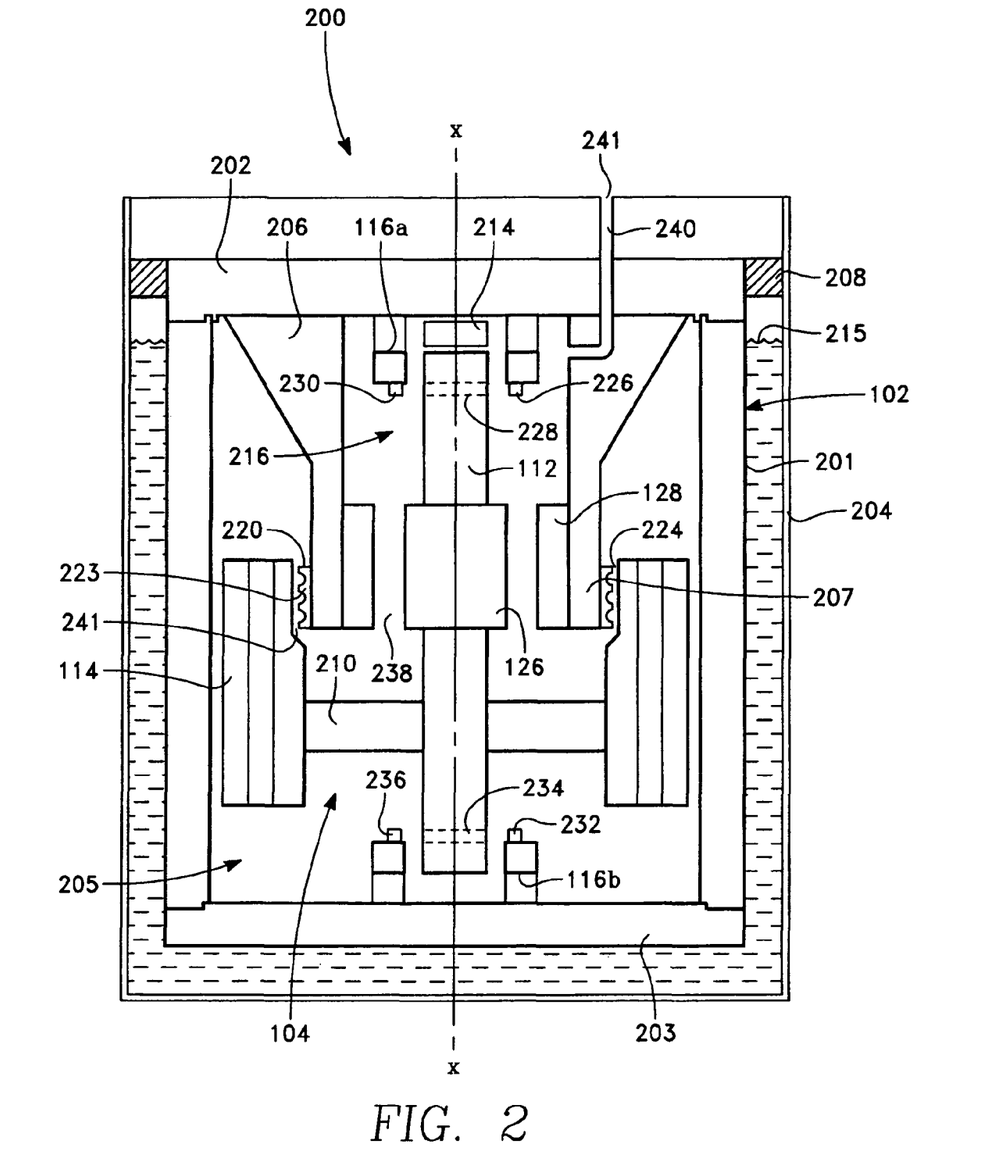
FIG. 2 is a schematic diagram showing a cross-section of a preferred flywheel and motor-generator of the flywheel power supply of FIG. 1A.

FIG. 2 shows an exemplary schematic cross-section of a flywheel and an associated motor-generator 200 in accordance with the present invention. An evacuated containment 102 includes a circumferential wall 201 about a substantially vertical axis x-x and upper and lower support plates 202, 203. In various embodiments, the support plates may be one or more of plate material, cast material, machined material or another suitable fabrication. Substantially bounding a flywheel chamber 205 is the circumferential wall and the upper and lower support plates.

In an embodiment, the circumferential wall and the lower support plate are a single integrated structure. The support plates may be substantially flat, curved or otherwise formed to provide needed support to stationary 106 and/or rotating parts 104 of the flywheel system 100. In some embodiments, an outer containment 204 envelops the evacuated containment. And, in some such embodiments, a liquid 215 filling at least a portion of the annular space between the circumferential wall and the outer containment damps relative motion between these parts; for example, in the event of a bearing failure causing rotating parts to transfer torque to the inner containment.

Within the evacuated container 102, a flywheel shaft 112 carries a motor-generator rotor 126 and a flywheel mass 114. The flywheel mass is constrained to rotate with the shaft. In an embodiment, the flywheel mass is coupled to the shaft via a hub 210. At least one electromagnetic bearing is operative to support the flywheel mass. In an embodiment, electromagnetic bearings 116a-b are operative to support the shaft.

As used in this patent specification, the term coupled means directly or indirectly connected. And, as persons of ordinary skill in the art will understand, some flywheels have integral shafts and/or bearing interfaces and, among these, some will not have a shaft that is distinguishable from the flywheel mass; for example, in some embodiments bearing interfaces with the flywheel mass itself provide flywheel mass support.

In an embodiment, a first magnetic bearing providing radial support 116a is located near the upper end of the shaft and a second magnetic bearing providing radial support 116b is located near the lower end of the shaft. In various embodiments, the bearings are supported by one or more of the support plates 202, 203 and the circumferential sidewall 201.

In some embodiments a third magnetic bearing providing axial support 214 is located near the upper end of the shaft. In various embodiments, selected bearings are either permanent magnet or electromagnetic bearings. And in some embodiments, the upper axial bearing includes a permanent magnet and an electromagnetic bearing.

Electromagnetic bearings may be used in conjunction with other types of bearings. For example, in an embodiment upper and lower radial bearings 116a-b are electromagnetic bearings and an upper axial bearing 214 includes both an electromagnetic and a permanent magnet bearing. Here, the upper radial bearing and upper axial bearing are supported by the upper support plate 202 and the lower radial bearing is supported by the lower support plate 203.

A motor-generator stator 128 is supported by the upper support plate 202. In an embodiment, the stator is at least partially encircled by a stator housing 206 which is in turn coupled to the upper support plate. In an embodiment, an annular flywheel 114 encircles a lower portion of the flywheel housing 207 such that a substantially annular rotor chamber 216 is formed. Here, the rotor chamber is substantially bounded by portions of the stator 128, stator housing 206, upper support plate 202, flywheel 114, hub 210, shaft 112 and motor-generator rotor 126.

In some embodiments the rotor is therefore enveloped by a first chamber that is partially enveloped by a stator support structure including a stator housing. And in some embodiments, this first chamber is substantially enveloped by a flywheel or second chamber.

Because the state of a flywheel power supply is characterized, at least in part, by the rotational speed of a flywheel mass, speed is typically a control system input. In an embodiment, shaft speed provides feedback for flywheel power supply control. Any suitable speed sensor such as mechanical, electromechanical, magnetic and optical sensors may be used. In an embodiment an optical speed sensor is used (as shown). Here, a light emitter 226 is in opposed relationship to a light sensor 230 with the shaft 112 therebetween. A hole in the shaft 228 provides an optical path between the sensor and the emitter two times for each revolution of the shaft. This provides a 2× shaft speed signal. In some embodiments, a backup light emitter, shaft hole and light sensor are provided 232, 234, 236.

Support Systems, Vacuum System

Flywheel component drag is reduced by operation one or more of the flywheel power supply's rotating parts 104 within an evacuated environment. Such an environment is created and/or maintained by removing unwanted gasses. For example, one or more of a conventional vacuum pump, molecular drag pump and getters may be used.

In an embodiment, within the flywheel chamber 205 is a molecular drag pump for evacuating the flywheel chamber. Here, gasses being evacuated from the flywheel chamber pass through a first gap 241 between the flywheel 114 and the stator housing 206, pass through a second gap 238 between the stator 128 and the rotor 126, and are subsequently removed from the rotor chamber 216. In some embodiments the gasses being evacuated travel through a conduit in fluid communication with the rotor chamber. In one example, the evacuation conduit 240 passes through the stator housing, the upper support and the outer containment, where a conduit connection interface 241 is provided.

Molecular drag pumps are formed by, among other things, adjacent parts that experience relative motion. In various embodiments, relative motion between a groove and a nearby surface creates the pumping action. In an embodiment, a molecular drag pump is formed between a flywheel inner surface 224 and a spiral-like groove surrounding a peripheral portion of the stator housing 223. In some embodiments the groove is formed in the stator housing or flywheel and in some embodiments the peripheral groove is formed in a removable ring 220 fixed to the stator housing (as shown) or flywheel. Here, gasses are evacuated from the flywheel chamber 205 via the rotor chamber 216 substantially due to pumping occurring when there is suitable relative motion between the flywheel inner surface and the spiral grooves. In various embodiments, groove pitch varies between greater than 0 degrees and less than 90 degrees.

Six Phase Motor-Generator Embodiment

A motor-generator includes electrical conductors associated with a stationary part referred to as a stator. In various embodiments, the conductors are arranged into one or more phases. In some embodiments, the motor-generator 122 of the present invention utilizes polyphase stator windings. For example, a plurality of stator windings may be used to form a polyphase stator such as a three or six phase stator. A dual three phase motor-generator stator example follows.

Figure 3A:
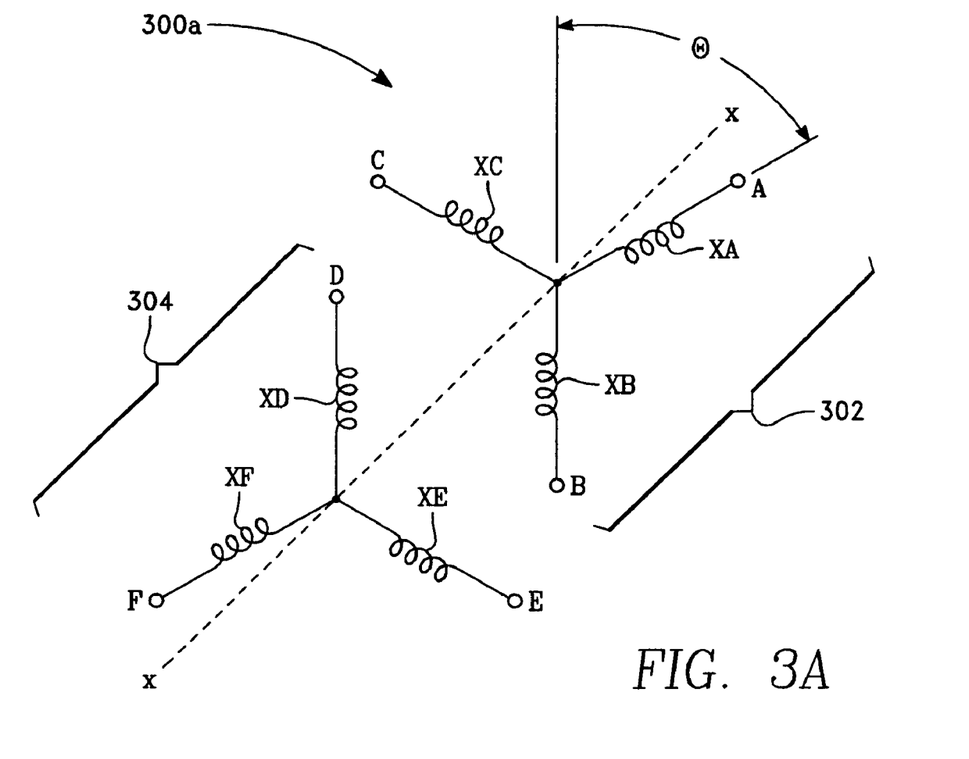
FIG. 3A is a schematic diagram of a six phase stator of the flywheel power supply of FIG. 1A.

FIG. 3A shows a six phase stator embodiment where two three-phase motor-generators are formed 300a. In particular, a single rotor with an axis of rotation along axis x-x is part of a first three phase machine with phases A, B and C 302 and part of a second three phase machine with phases D, E and F 304.

In the first machine, Coils XA, XB and XC are Wye connected and in the second machine coils XD, XE and XF are Wye connected. Each of phases A, B, and C are evenly spaced around the stator and each of the phases D, E and F are evenly spaced around the stator. Further, each of phases A, B and C are rotated thirty (30) degrees from each of phases D, E and F respectively such that one machine is thirty (30) degrees out of phase with the other machine. In various embodiments, each of coils XA-C and XD-E can be subdivided and/or replaced by multiple coils in series and/or in parallel.

Figure 3B:
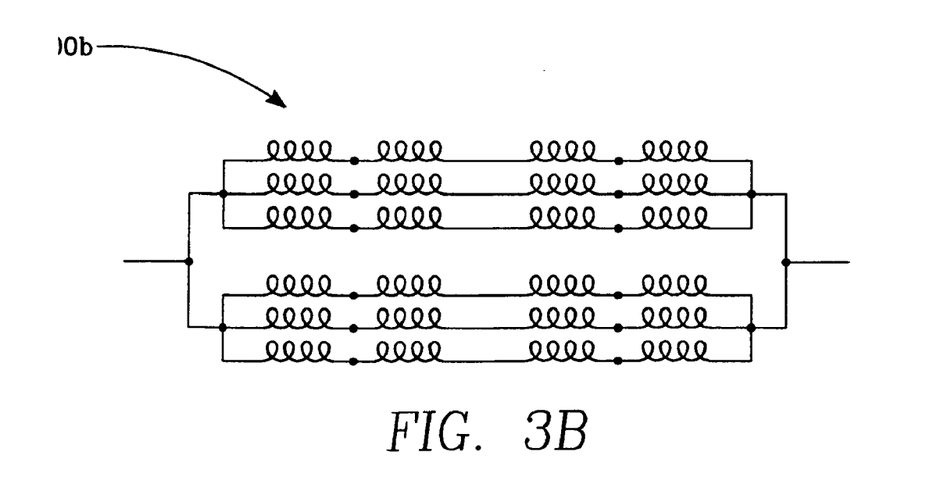
FIG. 3B is a schematic diagram of a coil configuration for use with a stator of the flywheel power supply of FIG. 1A.

In an embodiment, each of the stator coils XA-C and XD-E of FIG. 3A is replaced with a series-parallel coil configuration. In particular, the coil configuration 300b of FIG. 3B replaces each of the single coils shown in FIG. 3A. Using this coil configuration, a six phase, four pole, single layer machine is formed where: a) each phase consists of two paralleled windings; b) each winding consists of three coil sets in parallel and occupying the same slot; and c) each coil set has four coils wound continuously, with a crossover between the first two coils and the other two coils.

As persons of ordinary skill in the art will understand, these and other coil configurations may be used to construct a motor-generator stator and in particular a six phase motor-generator stator. Other examples include the stators disclosed by Khutorestsky et al. and Lipo et al. in U.S. Pat. Nos. 4,132,914 and 6,710,495. These patents are incorporated herein by reference.

Power Electronics and Controls

Figure 4:
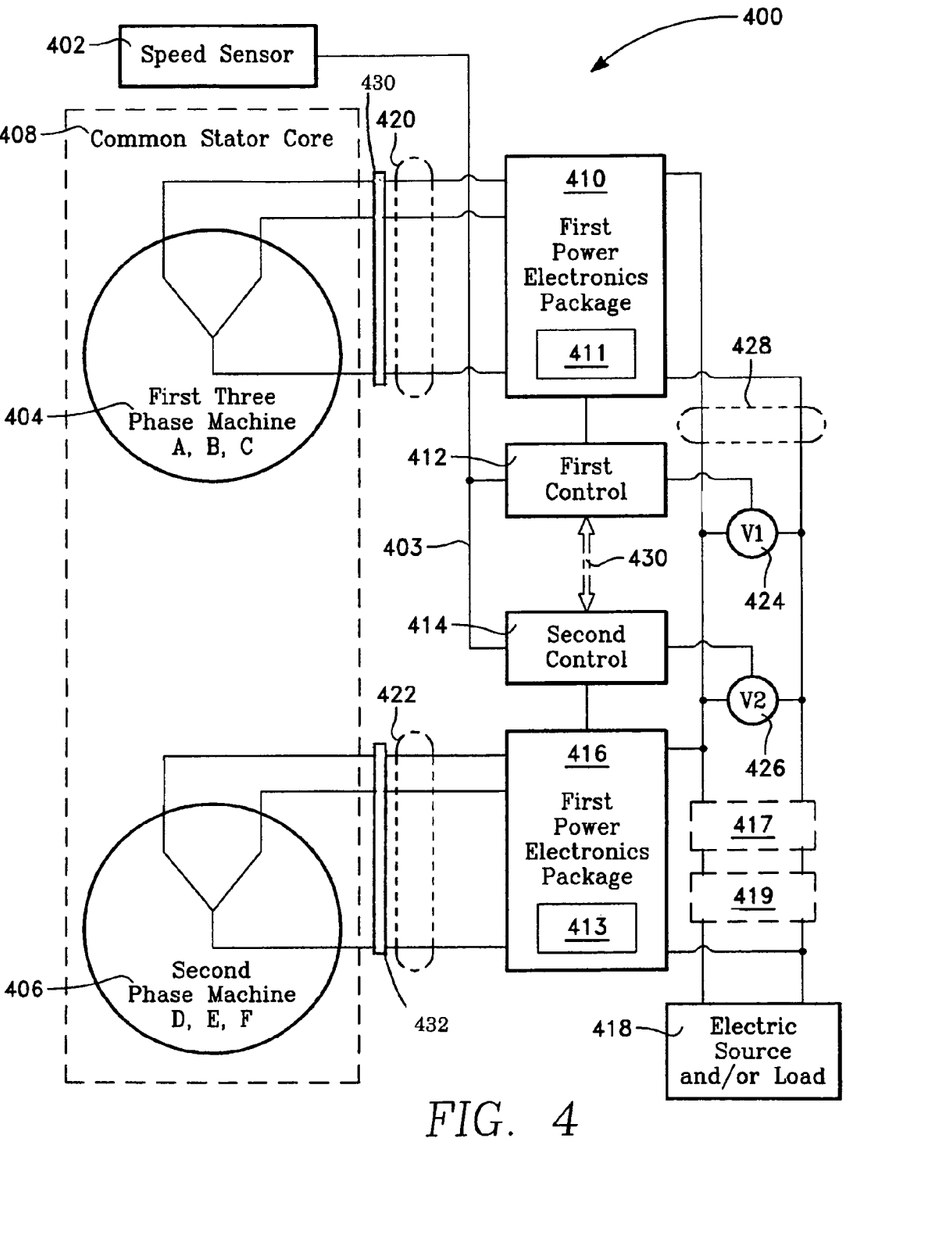
FIGS. 4-5 are schematic diagrams of power electronics and controls of an embodiment of the flywheel power supply of FIG. 1A.

FIG. 4 shows the power electronics and controls of an embodiment of the flywheel power supply 400. A first three phase machine 404 and a second three phase machine 406 utilize a common stator core 408. As shown in this example, the power exchanged with the first three phase machine 420 is processed by a first power electronics package 410 and the power exchanged with the second three phase machine 422 is processed by a second power electronics package 416.

In an embodiment, each power electronics package 410, 416 includes an AC to DC power converter 411, 413 coupling respective three phase machines 404, 406 with a bus 428 that is coupled to an electric source and/or load 418. As will be understood by a person of ordinary skill in the art, bi-directional power converters are utilized where power is both delivered to and sourced from an electric source and load 418.

In various embodiments, the electrical source and load 418 indicates one or more electrical sources, one or more electrical loads, and combinations of sources and loads such as an electrical network receiving electric power from the grid. In some embodiments, the flywheel power supply 100 delivers backup power to a load on an electrical network interconnected with the flywheel power supply.

In another embodiment, each power electronics package 410, 416 includes respective AC to DC power converters coupling each three phase machine 404, 406 with a bus and a DC to DC 417 power converter coupling the bus to an electric source and/or load 418. In yet another embodiment, the power electronics package includes two AC to DC power converters coupling respective three phase machines with a bus and a DC to AC power converter 419 coupling the bus to an electric source and/or load 418. In various embodiments, the bus and/or the DC to AC converters are included within the power electronics packages.

In an embodiment, the two power electronics packages operate independently, without supervisory control. Here, each of a first power electronics controller of the first power electronics package 412 and a second power electronics controller of the second power electronics package 414 receive a common feedback signal 403 from a speed sensor 402 from which the speed of the flywheel shaft 112 can be derived. As discussed above, some embodiments use one or more optical speed sensors (see 226, 228, 230 and 232, 234, 236).

In various embodiments, a bus 428 couples the power electronics package to an electric source and/or load. Bus voltage V1 indicated by a first voltage transducer 424 is provided to the first power electronics package 410. In some embodiments, a second bus voltage V2 is measured by a second voltage transducer 426 and is provided to the second power electronics package.

In an embodiment, bus voltage measurement errors that might otherwise cause unequal sharing of power provided to a load 418 is resolved by utilizing an average voltage. Each controller 412, 414 utilizes a communications link 430 between the controllers to acquire the other controllers measured voltage. Once the voltage is acquired, the controllers calculate an average bus voltage (V1+V2)/2 which becomes the bus control voltage. Using the same bus control voltage minimizes or eliminates unequal load sharing problems associated with voltage measurement errors.

Figure 5:
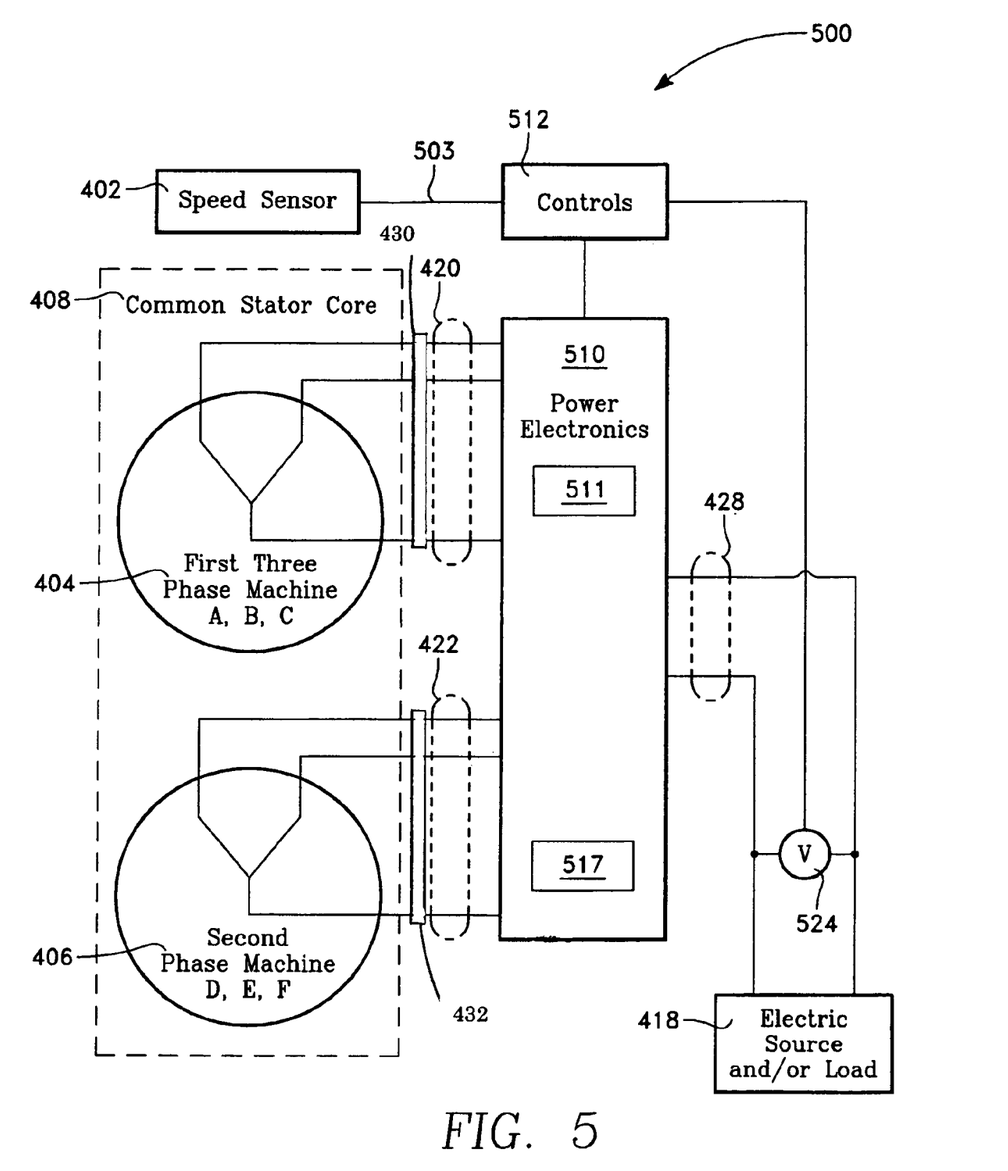

FIG. 5 shows the power electronics and controls of another embodiment of the flywheel power supply 500. Here, a single power electronics controller 512 is utilized. A first three phase machine 404 and a second three phase machine 406 utilize a common stator core 408. As shown in this example, the power exchanged with the first three phase machine 420 and the second three phase machine 422 is processed by a power electronics package 510 controlled by a single controller 512.

In an embodiment, the power electronics package 510 includes respective AC to DC power converters 511, 517 coupling each three phase machine with a bus 428 coupled with an electric source and/or load 418. In another embodiment, the power electronics package 510 includes respective AC to DC power converters coupling each three phase machine with a bus 428 and a DC to DC power converter 417 coupling the bus with an electric source and/or load 418. In yet another embodiment, the power electronics package 510 includes respective AC to DC power converters coupling each three phase machine with a bus 428 and a DC to AC power converter 419 coupling the bus with an electric source and/or load 418. In various embodiments, the bus and/or the DC to AC converter is included within the power electronics packages.

As will be understood by a person of ordinary skill in the art, bi-directional power converters are utilized where power is both delivered to and sourced from an electric source and load 418. The power exchanged between the three phase machines 404, 406 and the electric source and/or load 418 is controlled by the flywheel controls 512. The controls receive a feedback signal 503 from a speed sensor indicating motor-generator shaft speed and a voltage sensor indicating the voltage supplied to the load 524. As discussed above, some embodiments use one or more optical speed sensors (see 226, 228, 230 and 232, 234, 236).

In operation, the flywheel mass 114 spins in an evacuated containment 102 and bi-directionally exchanges mechanical energy with the motor-generator 122. Power electronics 124 interconnecting the motor-generator and an electric source and load 109 enables the transfer of electric power to and from the motor-generator which in turn accelerates or decelerates the of the flywheel mass 114. In a typical application, the flywheel power supply provides backup power for loads to be supported in the event of a loss of utility or other sources of electric power.

Permanent Magnet Generator

Figure 6:
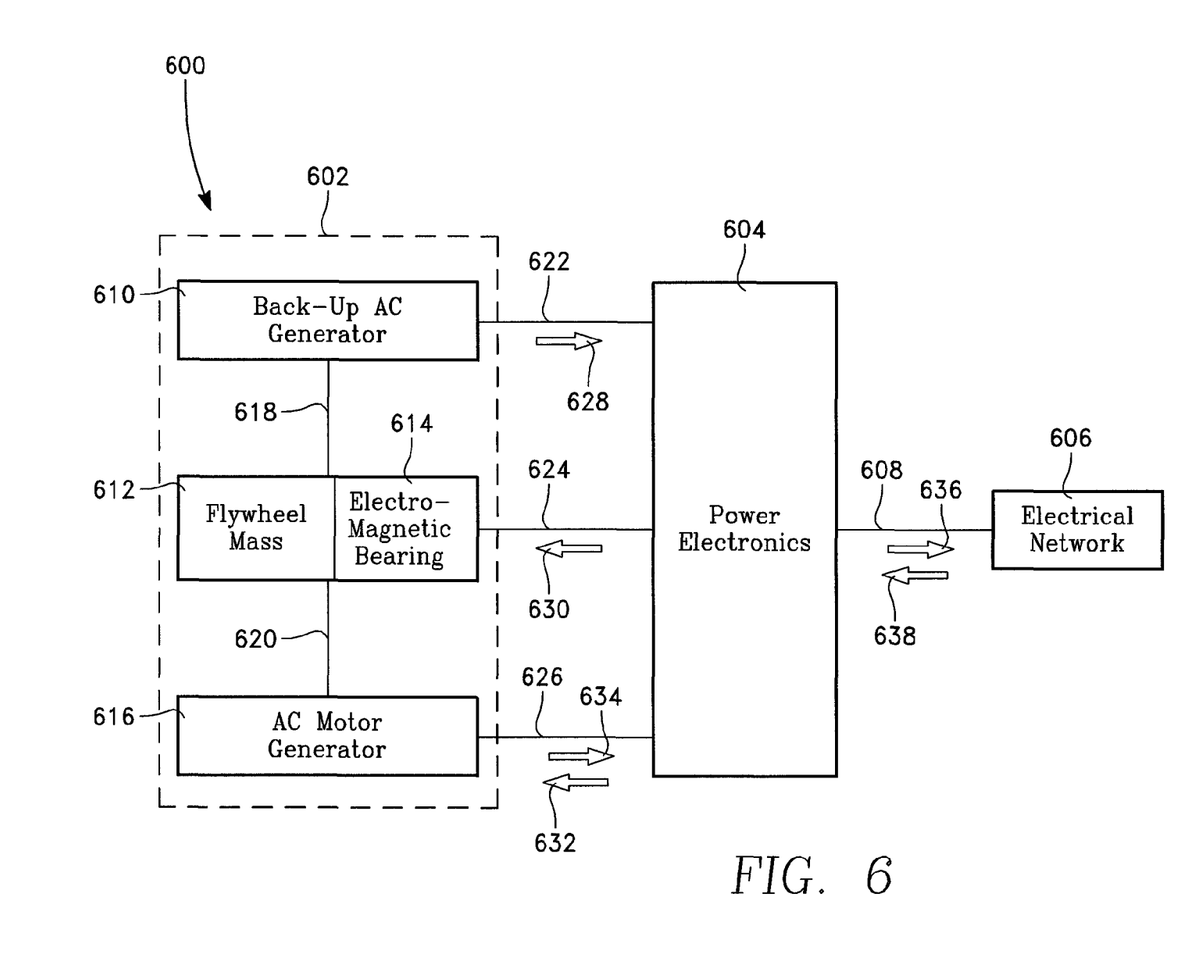
FIG. 6 is a diagram showing modules of a flywheel power supply of FIG. 1A.

FIG. 6 shows the flywheel system 600 of the present invention. It includes the flywheel module 602, power electronics module 604, and electrical network 606. In the flywheel module, a first rotatable coupling 620 interconnects the flywheel mass 612 with the motor-generator 616 and a second rotatable coupling 618 interconnects the flywheel mass with the backup generator 610. At least one electromagnetic bearing 614 provides rotatable support for the flywheel mass.

The power electronics module 604 is interconnected to sources and consumers of electric power including the backup generator 610, the motor-generator 616, and the electrical network 606, and at least one electromagnetic bearing 614.

A first electrical circuit 622 conducts electric power unidirectionally as shown by flow arrow 628 from the backup generator 610 to the power electronics module 604. A second electrical circuit 624 conducts electric power unidirectionally as shown by flow arrow 630 from the power electronics module to at least one electromagnetic bearing 614. A third electrical circuit 626 conducts electric power bi-directionally as shown by the opposed flow arrows 632, 634 between the motor-generator 616 and the power electronics module. A fourth electrical circuit 608 conducts electric power bi-directionally as shown by the opposed flow arrows 636, 638 between the power electronics module and the electrical network 606.

Flywheel system 600 charging includes absorption and storage of mechanical energy by increasing the rotational speed and hence kinetic energy of rotating elements within the flywheel module 602 including the flywheel mass 612. Flywheel system charging takes place when the electrical network 606 supplies electric power as shown by flow arrow 638 and the motor-generator 616 consumes electric power as indicated by flow arrow 632 while functioning as an electric motor.

Flywheel system 600 discharging includes releasing mechanical energy by decreasing the rotational speed and hence kinetic energy of rotating elements within the flywheel module 602 including flywheel mass 612. Flywheel discharging takes place when the electrical network 606 consumes electrical power as shown by flow arrow 636 that is supplied by the motor-generator 616 as shown by flow arrow 634 while the motor-generator functions as an electric generator.

Figure 7:
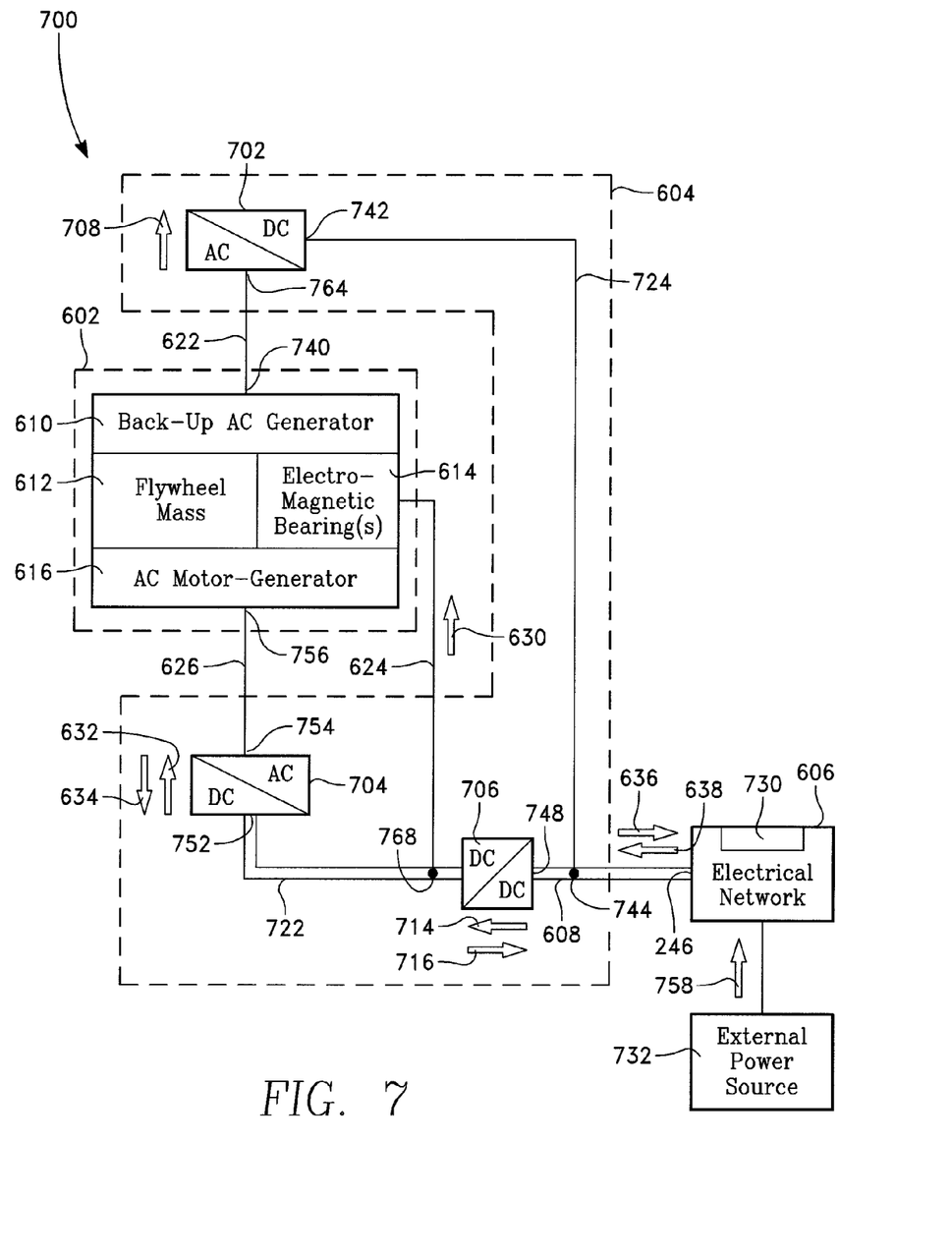
FIG. 7 is a diagram showing elements of a power electronics module of a flywheel power supply of FIG. 1A.

FIG. 7 shows a first embodiment of the flywheel system including selected elements of the power electronics module 700. The power electronics module 604 includes three electric power converters. The first converter 702 is a uni-directional AC-to-DC converter, the second converter is a bi-directional AC-to-DC converter 704, and the third converter is a bi-directional DC-to-DC converter 706. The power electronics module also includes an internal DC bus 722, an external DC bus 608, and a fifth circuit 724.

As mentioned above, the first, second, and third circuits interconnect the power electronics module 604 and the flywheel module 602. What follows is a description of selected sources and users of electric power flowing in these circuits.

The first circuit 622 interconnects a backup generator AC output 740 as indicated by flow arrow 708 to a first converter AC input 764. The fifth circuit 724 connects a first converter DC output 742 to an external DC bus tap 744 on the external DC bus 608. Electric power users including the electrical network 606 and the third converter 706 thereby receive backup power from their respective interconnections 746, 748 with the external DC bus.

The second circuit 624 interconnects an electromagnetic bearing electric power input 766 to an internal DC bus tap 768 on the internal DC bus 722. Electric power flows from the internal DC bus to the electromagnetic bearing(s) 614 as shown by flow arrow 630. The internal DC bus may receive electric power from the motor-generator 616, the electric network 606 or the backup generator 610. When the motor-generator is providing electric power, the motor-generator electrical connection 756 is an AC output interconnected to a second converter AC connection 754 by the third circuit 626. Power flows from a second converter DC connection 752 as indicated by flow arrow 634 to the internal DC bus. When the electric network is providing electric power, an electric network connection 746 is a DC output interconnected to a third converter external DC connection 748 by external DC bus 608. Power flows from a third converter internal DC connection 750 as indicated by flow arrow 714 to the internal DC bus. When the backup generator is providing electric power, power flows as described above from the backup generator to the external DC bus and thereafter to the internal DC bus.

Turning now to electric power flows associated with charging and discharging the flywheel system 600, the motor-generator 616 may function either as an electric motor or as an electric generator. During charging the motor-generator functions as an electric motor. During discharging, the motor-generator functions as an electric generator.

During charging, the electric network 606 provides DC power to the third converter 706 via external DC bus 608 as indicated by flow arrow 638. The converter adjusts the voltage to a level suitable for interconnection with the internal DC bus 722 and transfers electric power as indicated by flow arrow 714 to the internal DC bus. The second converter 704 takes power from the internal DC bus, synthesizes an AC output indicated by flow arrow 632, and transfers power to the motor-generator via third circuit 626. The AC output is suitable for powering the motor-generator 616 for accelerating the flywheel 860 (see FIG. 3).

During discharging, the second converter 704 receives electric power from the motor-generator 616 via third circuit 626 as indicated by flow arrow 634. The converter adjusts the voltage to a level suitable for interconnection with the internal DC bus 722 and transfers electric power to the internal DC bus. The third converter 706 takes power from the internal DC bus and adjusts the voltage as required for interconnection with the external DC bus 608. Flow arrows 716 and 636 indicate transfer of electric power from the second converter to the electrical network via the external DC bus.

It should be noted that although the electrical network 606 is interconnected to the external DC bus 608, a person of ordinary skill in the art will recognize that the electrical network may include electrical sources and loads having electrical characteristics that differ from those of the external DC bus. Auxiliary electric power converters 730 provide for interconnecting such sources and loads to the extent they are present in the network.

It should also be noted that while output 642 of first converter 602 may be processed by third converter 606 as shown in FIG. 2, in a second embodiment, a fourth unidirectional DC-to-DC electric power converter (not shown) might be used to interconnect first converter output 742 with the electromagnetic bearings 614. In this embodiment, the fourth converter adjusts the voltage level at first converter output 742 to accommodate the requirements of the electromagnetic bearings.

Figures 8A, 8B:
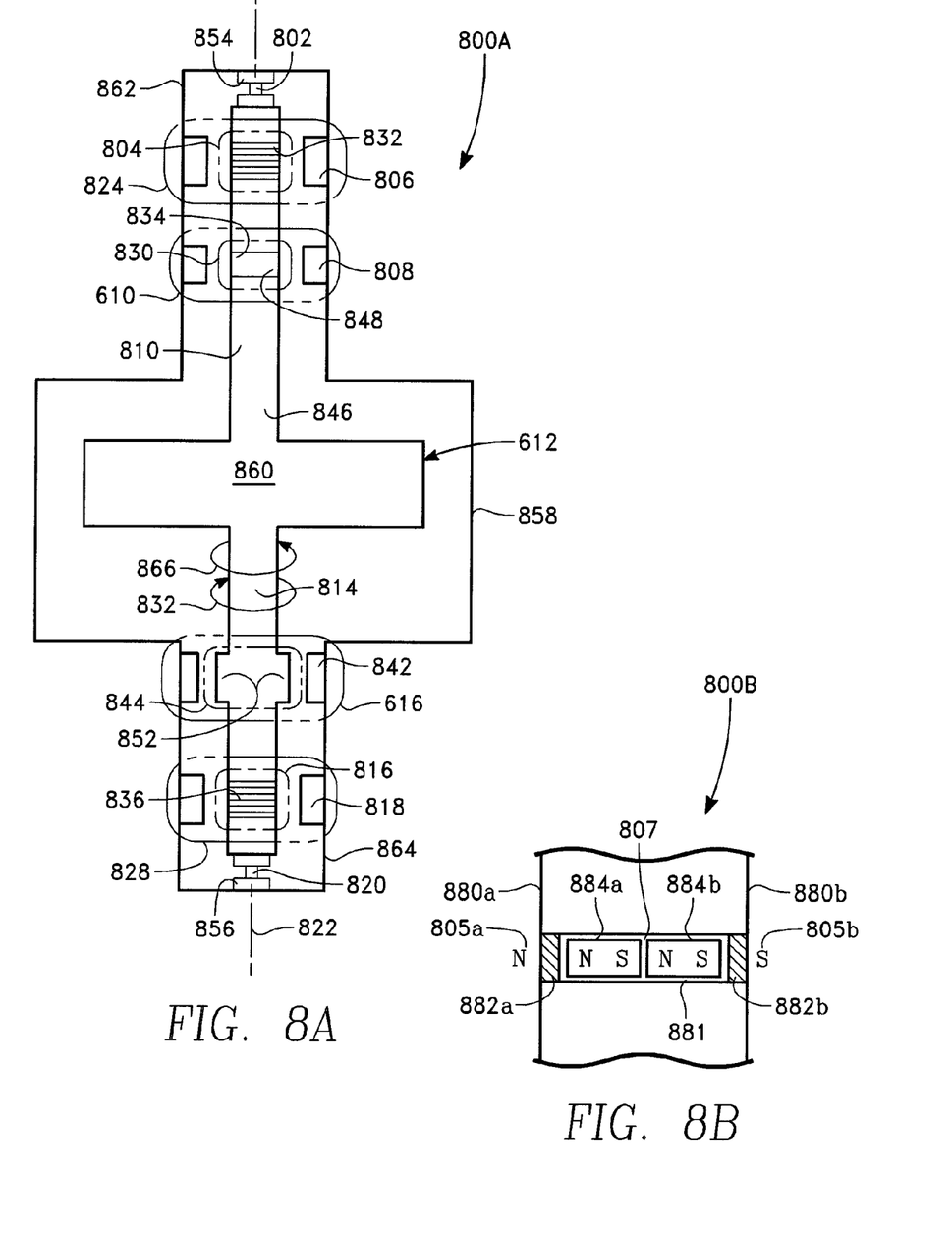
FIGS. 8a and 8b are diagrams showing elements of the flywheel module of a flywheel power supply of FIG. 1A.

FIG. 8A shows selected flywheel module elements 800. Rotating elements include the flywheel shaft 846 and the flywheel mass 612. Stationery elements include the flywheel housing 858, first and second electromagnets 806, 818, and first and second electric stators 808, 842. The flywheel 860 includes the flywheel mass 612 and the flywheel shaft 846. The flywheel shaft includes first and second sections 810, 814. The flywheel shaft shares a common axis of rotation 822 with and is attached to the flywheel mass.

The flywheel 860 has integrated features including antifriction bearings 854, 856 and electromagnetic bearings 824, 828, a backup AC generator 610, and a synchronous reluctance AC motor-generator 616. The sections that follow provide details relating to these features.

Antifriction bearings 854, 856 provide rotatable support to the flywheel 860 at low flywheel speeds. The flywheel utilizes first and second touchdown bearing shafts 802, 820 mated with respective first and second antifriction bearings 854, 856 for rotatable support. The antifriction bearings support both radial and thrust loads. The touchdown bearing shafts extend outwardly from respective opposing ends of the flywheel shaft and share a common axis of rotation 822 with the flywheel shaft 846. The first and second antifriction bearings 854, 856 are fixed to respective first and second flywheel housing parts 862, 864.

Electromagnetic bearing(s) 614 provide rotatable support to the flywheel 860 at higher flywheel speeds when the flywheel is no longer supported by the antifriction bearings 854, 856, but now relies on at least one electromagnetic bearing for support. Here, first and second electromagnetic bearings 824, 828 are shown. The first electromagnetic bearing 824 is proximate to the first shaft section 810 and includes an electromagnet 806 attached to the first flywheel housing part 862 and an adjacent ferromagnetic portion 804 that is integral with the flywheel shaft 846. The second electromagnetic bearing 828 is proximate to the second shaft section 814 and includes an electromagnet 818 attached to the second flywheel housing part 864 and an adjacent ferromagnetic portion 816 that is integral with the flywheel shaft 846.

Each of the ferromagnetic portions of the shaft 804, 816 includes a respective plurality of thin ferromagnetic laminates 832, 836 having electrical insulation interposed between adjacent laminates. These laminated ferromagnetic structures increase the effectiveness of the electromagnetic bearings by reducing eddy current losses. In particular, eddy currents induced in the ferromagnetic portions by the electromagnets result in $i^2r$ (current squared multiplied by resistance) heating losses. The thin ferromagnetic laminates reduce the magnetic flux in (results in smaller induced voltage) and the conductivity of (smaller conductive cross-section) each ferromagnetic laminate. The result is a reduction in eddy current losses by a factor of approximately $1/(n^2)$ where n is the number of lamella in a ferromagnetic portion.

The backup generator 610 is a variable speed permanent magnet AC machine. It includes a first electrical stator 808 adjacent to a flywheel shaft permanent magnet portion 830. The flywheel shaft permanent magnet portion is in the first flywheel shaft section 810 and includes a permanent magnet 848 integral with the flywheel shaft 846. As shown, the permanent magnet is located in a cavity 834 of the shaft.

Referring also to FIG. 8B a cross-sectional view of a permanent magnet structure is shown 800B. This structure increases backup generator 610 reliability by, among other things, increasing permanent magnet tolerance to operational stresses including stress induced by rotation of the shaft. A hole 881 in the shaft receives a plurality of permanent magnets shown as 884*a,b*. The magnets 884*a,b* are arranged such that respective South and North poles meet where the magnets abut 807 and such that a North pole 805*a* is created to one side of the shaft 880*a* and a South pole 805*b* is created at an opposed side of the shaft 880*b*. The magnets are held in place by respective permanent magnet holders 882*a,b* that prevent the magnets from leaving the hole in the shaft. The shaft portion surrounding the magnets is made from a non-magnetic material such as a nickel based alloy. In various embodiments, the magnet holders are made of ferrous and non-ferrous materials and in various embodiments the magnet holders are made of non-magnetic and magnetic materials.

Since a permanent magnet generator is self-exciting, the backup generator generates electric power as long as the flywheel 860 is rotating even if no external source of electric power is available. The backup generator therefore provides electric power to the electromagnetic bearings 824, 828 when operation of the electromagnetic bearing(s) is desirable and when no other electric power source is available to operate the electromagnetic bearing(s). As a person of ordinary skill in the art will recognize, the power produced by the backup generator may be used to power electric loads internal or external to the flywheel system 600.

The motor-generator 616 is any inductive AC machine known to ordinary persons of skill in the art such as a wound-rotor or a reluctance type machine. The motor-generator includes a second electrical stator 842 and a rotor 844.

In an embodiment, the motor-generator 616 is a variable speed synchronous reluctance AC machine. Here, the motor-generator includes a second electrical stator 842 adjacent to a flywheel shaft reluctor portion 844. The reluctor portion is in the second flywheel shaft section 814 and includes a plurality of ferromagnetic reluctor poles 852 integral with the flywheel shaft 846.

While functioning as an electric motor, the motor-generator 616 transfers torque 832 to the flywheel shaft 846 increasing the rotational speed of the flywheel 860. While functioning as an electric generator, the motor-generator transfers torque from 866 the flywheel shaft reducing the rotational speed of the flywheel.

Since the motor-generator is not self-exciting, it produces electric power only when induced electric currents magnetize the rotating reluctor poles 852. An externally excited stator 842 that is magnetically coupled with the reluctor portion induces such currents. Therefore, the motor-generator 616 cannot generate electric power unless there is a source of electric power external to the motor-generator. The power electronics 604 may provide the excitation power; however, when the flywheel 860 speed falls below a minimum value, useful generation of electric power by the motor-generator ends.

Figure 9:
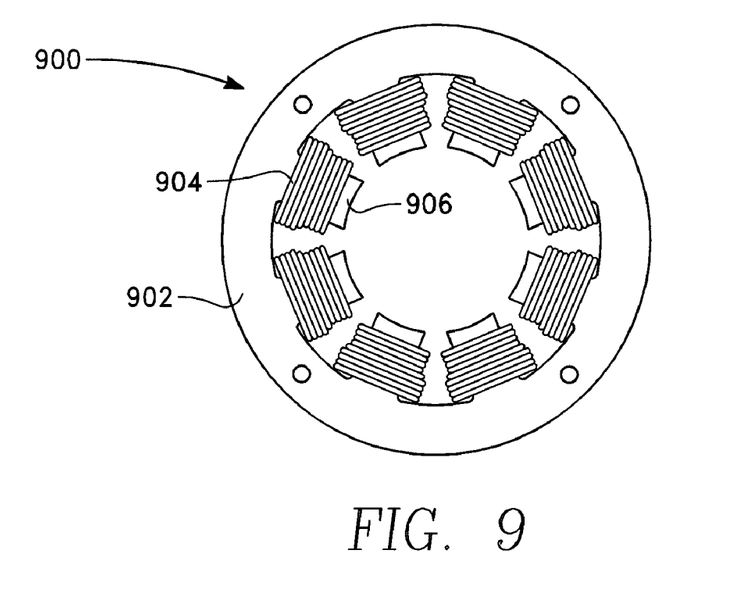
FIG. 9 is a diagram showing operating regimes of a flywheel power supply of FIG. 1A.

FIG. 9 is a side view showing an electrical stator 900. In an embodiment, the stator 902 has eight pole pieces 906, each pole piece being encircled by respective conductor(s) constituting at least one electrical circuit 904 (as shown). In an embodiment, the flywheel power supply 600 utilizes this eight pole stator in each of two radial electromagnetic bearings 824, 828. In some embodiments, this stator is also used in the backup generator 610.

Figure 10:
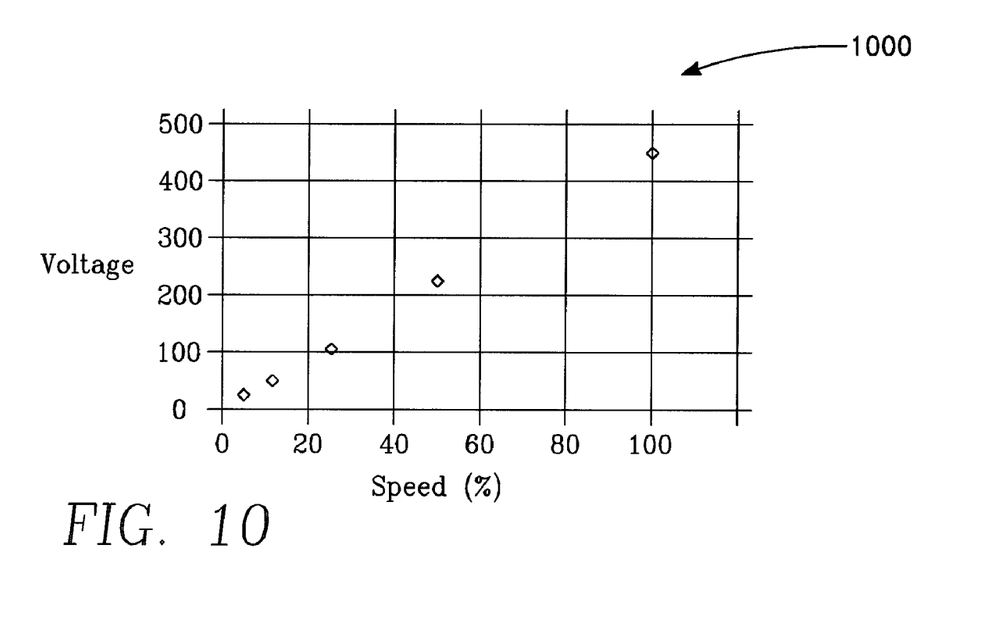
FIG. 10 is a graph showing a curve of voltage (volts) versus speed (%) for a permanent magnet generator according to an exemplary embodiment of the flywheel power supply of FIG. 1A.

It is noted that a permanent magnet backup generator 610 of various embodiments of the flywheel power supply 600 has a voltage output that varies about linearly with generator shaft speed. For example, FIG. 10 shows a curve of voltage (volts) versus speed (%) for a selected permanent magnet generator 1000. Here, it is seen that at a speed of 50%, the output voltage is about 225 volts and that at a speed of 100%, the output voltage is about 450 volts.

Figure 11:
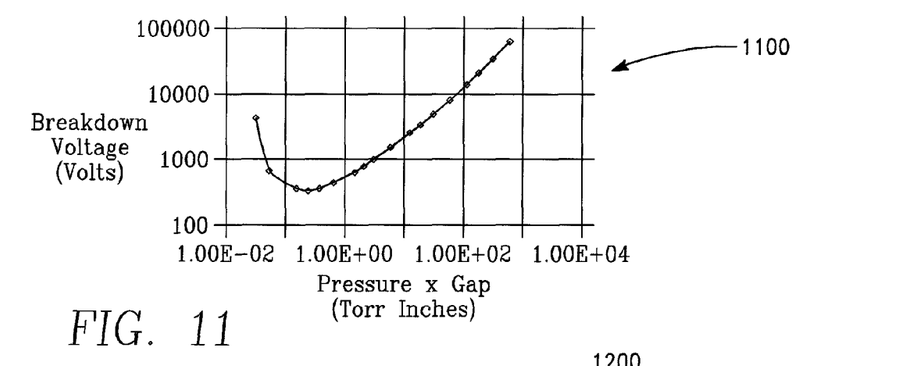
FIG. 11 is an illustrative diagram showing a curve of Breakdown Voltage (volts) versus Pressure×Gap (Torr Inches) according to an exemplary embodiment of the flywheel power supply of FIG. 1A.

FIG. 11 is an illustrative diagram showing a curve of Breakdown Voltage (volts) versus Pressure×Gap (Torr Inches). The curve shows the variation of breakdown voltage in air versus vacuum and gap. As might be expected, the larger the gap, the larger the breakdown voltage required to ionize a gas in the gap. But, the relationship between breakdown voltage and pressure (vacuum) for a particular gap is governed by Paschen's Law and is highly nonlinear having a dipper-like shape.

As shown by the figure, Paschen's curve passes through a minimum breakdown voltage between 0.1 Torr Inches and 1.0 Torr Inches where the breakdown voltage is between 300 and 400 volts. Paschen's Law is described by the equation $V=a(pd)/(\ln(pd)+b)$ where V is breakdown voltage in Volts, p is pressure, d is the gap distance and constants a and b depend upon the composition of the gas.

As can be seen from the above, flywheel, and especially high speed flywheel, power supplies present an elevated electrical arcing risk where there are high generator voltages such as those of linear speed-voltage machines operating at high speeds. Further, where the permanent magnet generator is operated in an evacuated environment, this risk is elevated yet again due to depressed breakdown voltages explained by Paschen's law.

In particular, use of a variable speed permanent magnet machine leads to identification of minimum and maximum design speeds, the voltages available from the generator at and between these speeds being suited for a selected power conversion process supporting a specified electrical load. Consider two example generators. In a first example, at 16,000 RPM the generator output voltage is 224 volts and at 32,000 RPM the output voltage is 448 volts. In a second example, at 16,000 RPM the output voltage is 150 volts, then at 32,000 RPM the output voltage is 300 volts.

The benefit of using the lower voltage range is that it falls below the minimum breakdown voltage of Paschen's Law for air. The benefit of using the higher voltage range is that, although it presents a risk of arcing, the available voltage is sufficient, without boosting, to support the load.

In an embodiment, backup generator output voltages below the voltage required by the electrical load are boosted by power electronics such that generator output voltages can be maintained below the minimum breakdown voltage of Paschen's Law.

In some embodiments, backup generator output voltages are manipulated using the switchable interconnections made possible by multiple circuits associated with the conductors encircling multiple stator poles. For example, two circuits interconnected in series (to increase voltage) might be used at low speeds while the same two circuits might be interconnected in parallel (to reduce voltage) for use at higher speeds. In various embodiments, selection(s) of series, parallel and series/parallel interconnection(s) of circuits is enabled by any of mechanical, electromechanical and semiconductor switches and the like.

Figure 12:
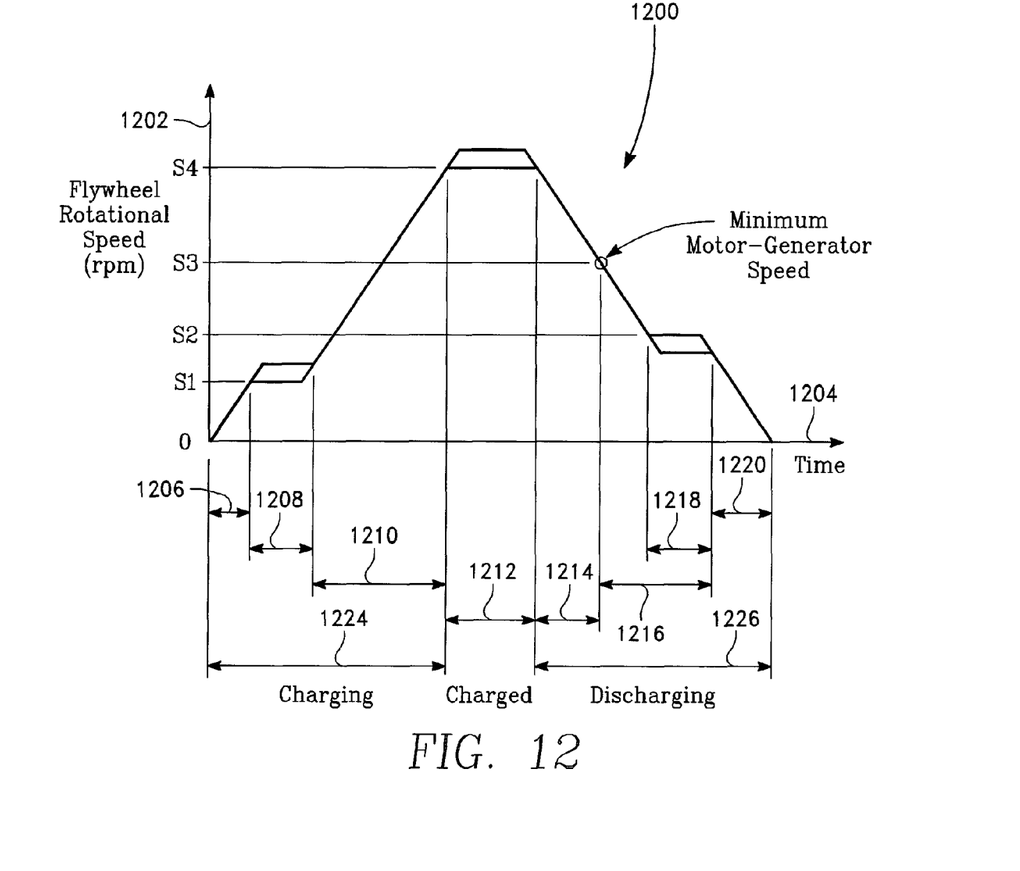
FIG. 12 is a graph that illustrates the charging, charged, and discharging cycles according to an exemplary embodiment of the flywheel power supply of FIG. 1A.

FIG. 12 is a graph 1200 that illustrates the charging, charged, and discharging cycle of the flywheel system 600. The vertical axis 1202 represents rotational speed of the flywheel mass 612 in revolutions per minute (RPM). The horizontal axis 1204 represents time.

Starting from a stand-still and during pre-liftoff 1206, flywheel system charging begins when the motor-generator 616 functions as a motor, applying an accelerating torque 832 to the flywheel shaft 846 as electrical power is converted to mechanical motion. As the flywheel 860 speed increases, the electromagnetic bearing(s) 824, 828 operate during speed range S1 to substantially disengage the touchdown bearing shafts 802, 820 from the antifriction bearings 854, 856; this is termed "liftoff" 1208.

During the post-liftoff period 1210, the flywheel 860 is accelerated to the maximum speed range S4. Upon reaching speed range S4, the flywheel is fully charged 1212. Prior to discharging, the motor-generator cycles on and off as required to maintain flywheel speed within speed range S4. This cycling is required to recover speed decay resulting from friction and other losses in the system.

While charging 1224 and cyclically while charged 1212, electrical power from the electrical network 106 is conducted in the direction of flow arrow 714 via external DC bus 108, the third converter 706, the internal DC bus 722, the second converter 704, and the third circuit 626 to the motor-generator 616. Electric power supplied to the internal DC bus by the electrical network also powers the electromagnetic bearing(s) 614 via second electrical circuit 624 as indicated by flow arrow 630.

The discharging period 1226 begins when the motor-generator 616 functions as a generator, applying a retarding torque 866 to the flywheel shaft 846 and converting the energy of mechanical motion into electric power. During this process, the rotational speed of the flywheel 860 is reduced. As the speed decreases from speed range S4 to speed S3, the motor-generator generates electric power. Note that similar flywheel discharging occurs when the electrical network's external power source 732 is interrupted: In this case, the power flow to the electrical network 606 indicated by flow arrow 758 stops and the electrical network becomes dependent on the flywheel system for delivery of electric power via external DC bus 608 as indicated by flow arrow 636.

During the initial discharging period 1214, electrical power from the motor-generator 616 is conducted in the direction of flow arrow 634 via the third circuit 626, the second converter 604, the internal DC bus 722, the third converter 706, and the external DC bus 608 to the electrical network 606 as indicated by flow arrow 636. Electrical power supplied to the internal DC bus by the motor-generator also powers the electromagnetic bearings 824, 828 via the second circuit 624 as indicated by flow arrow 630.

When the flywheel 860 reaches the minimum motor-generator speed S3, the synchronous reluctance (inductive) motor-generator 616 is no longer able to provide enough electric power to operate the electromagnetic bearing(s) 824, 828. During the subsequent backup power speed regime 1216, the backup generator 610 provides sufficient electric power to operate the electromagnetic bearings. The backup generator also provides electric power for other electrical loads that may be necessary to the safe shut-down of the flywheel. As one who is skilled in the art will recognize, backup generator power is available via external DC tap 744 and internal DC tap 768 for powering critical loads whether they be internal or external to the flywheel system 600.

When touchdown 1218 occurs in speed range S2, the electromagnetic bearing(s) are no longer needed and the antifriction bearing shafts 802, 820 are once again supported by respective antifriction bearings 854, 856.

During the backup power speed regime 1216, electrical power from the backup generator 610 flows as indicated by flow arrow 708 via the first converter, the fifth circuit 724, the external DC bus 608, the third converter 706, the internal DC bus 722, and the sixth circuit 624 to the electromagnetic bearings 614 as indicated by the flow arrow 630. Here, the third converter is included in the power flow path to accommodate the backup generator's variable voltage output that rises and falls with the speed of the flywheel 860.

Post-touchdown 1220 begins when the speed of the flywheel 860 falls below speed range S2. This regime is the final portion of the discharging process 1226. If a source of external power is not available, the flywheel will come to rest.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A flywheel system comprising:
   a rotatable assembly including a flywheel mass and variable speed synchronous reluctance motor-generator rotor;
   the flywheel mass and the synchronous reluctance motor-generator rotor located between upper and lower supports;
   the flywheel mass and the synchronous reluctance motor-generator rotor having a single, substantially vertical axis of rotation;
   the flywheel mass constrained to rotate in synchrony with the synchronous reluctance motor-generator rotor;
   a substantially non-magnetic part of the rotatable assembly defining a cavity therein;
   the cavity housing first and second abutting permanent magnets;
   a first fixed assembly including a first electrical stator adjacent to the cavity;
   a second fixed assembly including a second electrical stator adjacent to the synchronous reluctance motor-generator rotor;
   the upper support bearing the weight of the second electrical stator;
   a containment enveloping the rotating assembly and the first and second fixed assemblies;
   the flywheel system operable to supply an external load with electric power from the second stator; and,
   the flywheel system operable to supply a load critical to safe flywheel system operation with electric power from the first stator.

* * * * *